(12) United States Patent
Brekke et al.

(10) Patent No.: US 11,752,398 B2
(45) Date of Patent: *Sep. 12, 2023

(54) GOLF CLUB HEAD

(71) Applicant: SUMITOMO RUBBER INDUSTRIES, LTD., Kobe (JP)

(72) Inventors: Dustin Brekke, Fountain Valley, CA (US); Jacob Lambeth, Irvine, CA (US); Jake Grenier, Huntington Beach, CA (US); Joseph Chen, Costa Mesa, CA (US)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,145

(22) Filed: Aug. 30, 2021

(65) Prior Publication Data

US 2021/0387060 A1 Dec. 16, 2021

Related U.S. Application Data

(63) Continuation of application No. 16/938,107, filed on Jul. 24, 2020, now Pat. No. 11,130,023.

(60) Provisional application No. 63/032,224, filed on May 29, 2020.

(51) Int. Cl.
| | | |
|---|---|---|
| *A63B 53/04* | (2015.01) | |
| *A63B 53/02* | (2015.01) | |
| *B29C 45/00* | (2006.01) | |
| *B22D 19/00* | (2006.01) | |
| *B29L 31/52* | (2006.01) | |

(52) U.S. Cl.
CPC ............ *A63B 53/02* (2013.01); *A63B 53/047* (2013.01); *B22D 19/00* (2013.01); *B29C 45/0053* (2013.01); *A63B 2053/0479* (2013.01); *B29C 2045/0079* (2013.01); *B29L 2031/5227* (2013.01)

(58) Field of Classification Search
CPC ... A63B 53/0408; A63B 53/047; A63B 53/02; A63B 2053/0479; A63B 53/5304
USPC .................................................. 473/324–350
See application file for complete search history.

(56) References Cited

U.S. PATENT DOCUMENTS

| | | | | |
|---|---|---|---|---|
| 4,793,616 A | * | 12/1988 | Fernandez | A63B 53/047 473/347 |
| 5,105,550 A | * | 4/1992 | Shenoha | A63B 60/42 33/549 |

(Continued)

OTHER PUBLICATIONS

Feb. 12, 2021 Office Action issued in U.S. Appl. No. 16/938,107.
May 26, 2021 Notice of Allowance issued in U.S. Appl. No. 16/938,107.

*Primary Examiner* — Alvin A Hunter
(74) *Attorney, Agent, or Firm* — Oliff PLC

(57) ABSTRACT

A golf club head includes a center of gravity spaced less than 5 mm from a vertical center plane that is perpendicular to a striking face plane and extends through a striking face center. The golf club head also includes a first component having a first melting point and a first density and a second component having a second melting point higher than the first melting point and a second density less than the first density. And the second component (i) is at least partially encapsulated by the first component, (ii) extends into a hosel portion below a hosel bore, and (iii) has a mass less than about 5 g.

19 Claims, 10 Drawing Sheets

(56) References Cited

U.S. PATENT DOCUMENTS

| | | | | |
|---|---|---|---|---|
| 5,295,686 A * | 3/1994 | Lundberg | ............... | A63B 53/00 |
| | | | | 473/291 |
| 5,542,664 A * | 8/1996 | Mahaffey | ............... | A63B 60/00 |
| | | | | 473/305 |
| 5,562,551 A * | 10/1996 | Rife | ..................... | A63B 53/047 |
| | | | | 473/291 |
| 5,595,548 A | 1/1997 | Beck | | |
| 5,766,091 A | 6/1998 | Humphrey et al. | | |
| 6,287,214 B1 * | 9/2001 | Satoh | ..................... | A63B 53/02 |
| | | | | 473/305 |
| 6,346,052 B1 * | 2/2002 | Chappell | ................ | A63B 60/00 |
| | | | | 473/409 |
| 6,352,483 B1 * | 3/2002 | Okoshi | .................. | A63B 53/04 |
| | | | | 473/305 |
| 6,478,691 B2 * | 11/2002 | Okoshi | .................. | A63B 53/02 |
| | | | | 473/305 |
| 6,561,921 B2 * | 5/2003 | Takeda | .................. | A63B 53/02 |
| | | | | 473/305 |
| 6,617,050 B2 * | 9/2003 | Chao | ..................... | C21D 6/005 |
| | | | | 420/74 |
| 6,935,967 B2 * | 8/2005 | Mahaffey | ............... | A63B 60/00 |
| | | | | 473/291 |
| 7,040,000 B2 * | 5/2006 | Takeda | .................. | A63B 60/00 |
| | | | | 29/524 |
| 7,090,590 B2 * | 8/2006 | Chen | ..................... | A63B 53/047 |
| | | | | 473/324 |
| 7,153,222 B2 * | 12/2006 | Gilbert | ................ | A63B 53/047 |
| | | | | 473/290 |
| 7,166,042 B2 * | 1/2007 | Gilbert | ................ | A63B 53/047 |
| | | | | 473/291 |
| 7,186,187 B2 * | 3/2007 | Gilbert | ................ | A63B 53/047 |
| | | | | 473/290 |
| 7,186,188 B2 * | 3/2007 | Gilbert | ................ | A63B 60/54 |
| | | | | 473/332 |
| 7,192,361 B2 * | 3/2007 | Gilbert | ................ | A63B 53/00 |
| | | | | 473/331 |
| 7,192,362 B2 * | 3/2007 | Gilbert | ................ | A63B 53/00 |
| | | | | 473/332 |
| 7,232,377 B2 * | 6/2007 | Gilbert | ................ | A63B 53/047 |
| | | | | 473/332 |
| 7,273,418 B2 * | 9/2007 | Gilbert | ................ | A63B 60/54 |
| | | | | 473/332 |
| 7,371,190 B2 * | 5/2008 | Gilbert | ................ | A63B 53/00 |
| | | | | 473/332 |
| 7,380,325 B2 * | 6/2008 | Takeda | ................ | A63B 53/047 |
| | | | | 473/324 |
| 7,396,290 B2 * | 7/2008 | Gilbert | ................ | A63B 60/54 |
| | | | | 473/290 |
| 7,485,049 B2 * | 2/2009 | Gilbert | ................ | A63B 60/54 |
| | | | | 473/331 |
| 7,513,835 B2 * | 4/2009 | Belmont | ............... | A63B 53/047 |
| | | | | 473/328 |
| 7,559,850 B2 * | 7/2009 | Gilbert | ................ | A63B 60/02 |
| | | | | 473/332 |
| 7,662,050 B2 * | 2/2010 | Gilbert | ................ | A63B 53/047 |
| | | | | 473/332 |
| 7,699,716 B2 * | 4/2010 | Burnett | ............... | A63B 53/047 |
| | | | | 473/282 |
| 7,803,062 B2 * | 9/2010 | Gilbert | ................ | A63B 53/0475 |
| | | | | 473/331 |
| 7,811,179 B2 * | 10/2010 | Roach | .................. | A63B 53/047 |
| | | | | 473/335 |
| 7,811,180 B2 * | 10/2010 | Roach | .................. | C25D 11/243 |
| | | | | 473/349 |
| 7,815,523 B2 * | 10/2010 | Knutson | ............... | A63B 60/02 |
| | | | | 473/349 |
| 7,909,706 B2 * | 3/2011 | Cole | ..................... | A63B 53/02 |
| | | | | 473/308 |
| 7,976,403 B2 * | 7/2011 | Gilbert | ................ | A63B 53/04 |
| | | | | 473/309 |
| 7,980,960 B2 * | 7/2011 | Gilbert | ................ | A63B 53/047 |
| | | | | 473/290 |
| 8,133,133 B2 * | 3/2012 | Gilbert | .................. | A63B 60/54 |
| | | | | 473/350 |
| 8,182,359 B2 * | 5/2012 | Gilbert | ................ | A63B 53/047 |
| | | | | 473/332 |
| 8,197,354 B2 * | 6/2012 | Gilbert | .................. | A63B 60/54 |
| | | | | 473/290 |
| 8,206,237 B2 * | 6/2012 | Gilbert | ................ | A63B 53/047 |
| | | | | 473/332 |
| 8,235,832 B2 * | 8/2012 | Burnett | ................ | A63B 53/047 |
| | | | | 473/290 |
| 8,292,757 B2 * | 10/2012 | Soracco | ............ | A63B 53/0466 |
| | | | | 473/335 |
| 8,323,122 B2 * | 12/2012 | Soracco | ................ | B33Y 80/00 |
| | | | | 473/349 |
| 8,388,464 B2 * | 3/2013 | Gilbert | ................ | A63B 60/02 |
| | | | | 473/332 |
| 8,454,453 B2 * | 6/2013 | Hettinger | ............... | A63B 53/02 |
| | | | | 473/350 |
| 8,480,507 B2 * | 7/2013 | Finn | ..................... | A63B 53/047 |
| | | | | 473/291 |
| 8,568,249 B2 * | 10/2013 | Gilbert | .................. | A63B 53/04 |
| | | | | 473/349 |
| 8,616,997 B2 * | 12/2013 | Roach | .................... | C25D 11/04 |
| | | | | 473/328 |
| 8,740,721 B2 * | 6/2014 | Yamamoto | ........... | A63B 53/047 |
| | | | | 473/332 |
| 8,870,682 B2 * | 10/2014 | Roach | .................... | A63B 53/047 |
| | | | | 473/349 |
| 8,870,683 B2 * | 10/2014 | Hettinger | ............... | A63B 53/02 |
| | | | | 473/349 |
| 8,876,631 B2 * | 11/2014 | Cackett | .................. | A63B 53/04 |
| | | | | 473/335 |
| 8,926,451 B2 * | 1/2015 | Deshmukh | ............. | B21K 17/00 |
| | | | | 473/349 |
| 8,998,742 B2 * | 4/2015 | Ines | ........................ | A63B 60/00 |
| | | | | 473/291 |
| 9,011,266 B2 * | 4/2015 | Brunski | ................ | A63B 60/42 |
| | | | | 473/345 |
| 9,199,144 B2 * | 12/2015 | Mendoza | ........... | A63B 53/0475 |
| 9,295,887 B2 * | 3/2016 | Radcliffe | ............. | A63B 53/047 |
| 9,387,370 B2 * | 7/2016 | Hebreo | ................ | B21K 17/00 |
| 9,387,374 B2 * | 7/2016 | Golden | ................ | A63B 53/047 |
| 9,393,470 B2 * | 7/2016 | Roach | .................... | C25D 5/022 |
| 9,427,633 B2 * | 8/2016 | Oldknow | ............. | A63B 53/047 |
| 9,427,635 B2 * | 8/2016 | Ines | ........................ | A63B 53/047 |
| 9,504,887 B2 * | 11/2016 | Ines | ........................ | B23K 31/02 |
| 9,517,393 B2 * | 12/2016 | Cardani | ............. | A63B 53/0475 |
| 9,539,478 B2 * | 1/2017 | Narita | .................. | A63B 53/047 |
| 9,616,303 B2 * | 4/2017 | Wu | ........................ | A63B 60/02 |
| 9,616,304 B2 * | 4/2017 | Deshmukh | ............. | B21K 17/00 |
| 9,623,300 B2 * | 4/2017 | Oldknow | ............. | A63B 53/047 |
| 9,849,355 B2 * | 12/2017 | Seagram | ............... | A63B 53/047 |
| 9,849,356 B2 * | 12/2017 | Roach | .................... | A63B 53/0475 |
| 9,884,231 B2 * | 2/2018 | Hebreo | ................ | A63B 53/02 |
| 9,889,352 B2 * | 2/2018 | Ines | ........................ | A63B 60/00 |
| 9,943,732 B2 * | 4/2018 | Jacaman | ................ | A63B 53/02 |
| 9,981,168 B2 * | 5/2018 | Ines | ........................ | A63B 60/00 |
| 10,039,963 B2 * | 8/2018 | Ripp | ..................... | A63B 53/047 |
| 10,052,534 B1 * | 8/2018 | Ines | ........................ | A63B 60/02 |
| 10,092,800 B2 * | 10/2018 | Oldknow | ............. | A63B 53/047 |
| 10,137,335 B2 | 11/2018 | Hope et al. | | |
| 10,207,162 B2 * | 2/2019 | Deshmukh | ......... | A63B 53/0475 |
| 10,220,275 B2 * | 3/2019 | Hebreo | .................. | A63B 53/04 |
| 10,238,930 B2 * | 3/2019 | Ripp | ..................... | A63B 53/06 |
| 10,423,945 B2 * | 9/2019 | Long | ..................... | A63B 71/0619 |
| 10,467,608 B2 * | 11/2019 | Beach | .................... | G06Q 20/00 |
| 10,493,336 B2 * | 12/2019 | Taylor | .................. | A63B 60/00 |
| 10,561,909 B2 * | 2/2020 | Ripp | ..................... | A63B 53/04 |
| 10,617,919 B2 * | 4/2020 | Ines | ........................ | A63B 60/02 |
| 10,661,130 B2 * | 5/2020 | Oldknow | ............. | A63B 53/047 |
| 10,688,354 B2 * | 6/2020 | Doi | ......................... | B21J 1/06 |
| 10,695,627 B2 * | 6/2020 | Snyder | ................ | A63B 53/047 |
| 10,758,792 B2 * | 9/2020 | Shimahara | ........... | A63B 53/047 |
| 10,780,329 B2 * | 9/2020 | Ripp | ..................... | A63B 53/06 |

(56) References Cited

U.S. PATENT DOCUMENTS

| | | | |
|---|---|---|---|
| 10,843,052 B2* | 11/2020 | Seagram | A63B 53/047 |
| 11,130,023 B1* | 9/2021 | Brekke | A63B 53/0475 |
| 2002/0077193 A1* | 6/2002 | Takeda | A63B 53/02 473/305 |

* cited by examiner

GOLF CLUB HEAD

RELATED APPLICATIONS

This is a Continuation of application Ser. No. 16/938,107 filed Jul. 24, 2020, which in turn claims priority to U.S. Provisional Patent Application No. 63/032,224. The entire contents of that application are incorporated by reference herein.

BACKGROUND

This disclosure relates generally to the field of golf clubs. More particularly, it relates to a golf club head with an insert in at least the hosel portion of the club head.

A goal of golf club head design is to align the club head's center of gravity with the location on the striking face most likely to come into contact with the golf ball during a swing. This increases shot accuracy and helps ensure that as much energy as possible from the golfer's swing is transferred to the golf ball at impact, thereby resulting in a favorable golf shot.

SUMMARY

But this goal can often be difficult to achieve within the constraints of a given mass budget. This is especially true in connection with "player" iron-type golf club heads, in which the center of gravity of the club head is naturally biased toward the heel side from face center due to the shaping and weight of the heel and hosel portions. Golfers who use these club heads also often enjoy their more traditional look, and these golfers may thus object to changes designed to beneficially alter the weight profile of the club head but that also cause the club head to diverge from this traditional look. For example, perimeter weighting may be added to an iron or wedge-type golf club head to increase its moments of inertia and thereby add "forgiveness" on off-center hits, but the appearance of such a cavity-back club head can be off-putting for players who prefer the appearance of blade-type irons and wedges. A need thus exists for a design that discretely moves weight from one portion of the club head to another so as to move the center of gravity closer to where the golf ball is likely to be struck, most likely the face center of the club head, while also providing forgiveness on off-center hits.

A golf club head according to one or more aspects of the present disclosure thus includes, when oriented in a reference position, a striking face having a face center and defining a face plane; a vertical center plane that is perpendicular to the face plane and extends through the face center; a sole portion; a top portion; a heel portion; a toe portion opposite the heel portion; a hosel portion extending from the heel portion and comprising a hosel bore with an open end for receiving a shaft and a bottom surface, the hosel bore defining a central hosel axis; and a center of gravity spaced less than 5 mm from the vertical center plane. The golf club head may also include a first component of a first material having a first melting point and a first density and a second component having a second melting point higher than the first melting point and a second density less than the first density, the second component (i) being at least partially encapsulated by the first component, (ii) extending into the hosel portion below the hosel bore, and (iii) having a mass less than about 5 g.

A method of manufacturing a golf club head in accordance with one or more aspects of the present disclosure may in turn include steps of: (a) forming an auxiliary component with an auxiliary material; (b) encapsulating, by an investment casting process, the auxiliary component within a golf club head body comprising a primary material; and (c) removing a portion of the auxiliary component to create a hosel bore with an open end and a bottom surface such that an uppermost extent of the auxiliary component is below the bottom surface. The primary material may have a first melting point and a first density, and the auxiliary material may have a second melting point greater than the first melting point and a second density less than the first density. And the golf club head may further include: a striking face having a face center and defining a face plane; a vertical center plane substantially perpendicular to the face plane and passing through the face center; and a center of gravity located less than 5 mm from the vertical center plane.

And another golf club head according to one or more aspects of the present disclosure may include a golf club head main body and an auxiliary component. The golf club head main body may in turn include a striking face having a face center and defining a face plane; a vertical center plane that is perpendicular to the face plane and extends through the face center; a sole portion; a top portion; a heel portion; a toe portion opposite the heel portion; a hosel portion extending from the heel portion and comprising a hosel bore with an open end and a bottom surface, the hosel bore defining a central hosel axis; and a first material having a first melting point and a first density. The auxiliary component may in turn include a heel portion comprising a second material having a second melting point higher than the first melting point and a second density less than the first density; an upper extent located below the bottom surface of the hosel bore; and a toe portion connected to the heel portion and comprising a third material having a density greater than the first density. And a center of gravity of this golf club head may be located less than 5 mm from the vertical center plane.

These and other features and advantages of the golf club heads and manufacturing methods thereof according to the various aspects of the present disclosure will become more apparent upon consideration of the following description, drawings, and appended claims. The description and drawings described below are for illustrative purposes only and are not intended to limit the scope of the present invention in any manner.

DETAILED DESCRIPTION OF EMBODIMENTS

Figure 1:
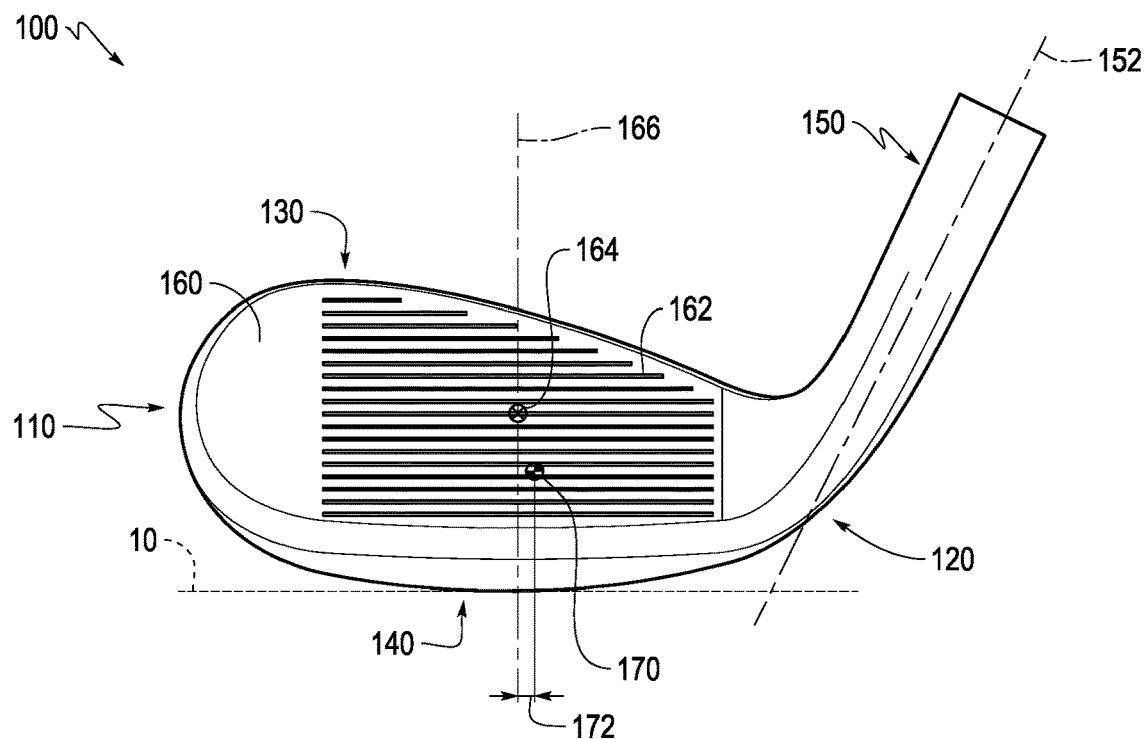
FIG. 1 shows a front elevation view of an exemplary golf club head in accordance with one or more aspects of the present disclosure.
Figure 2:
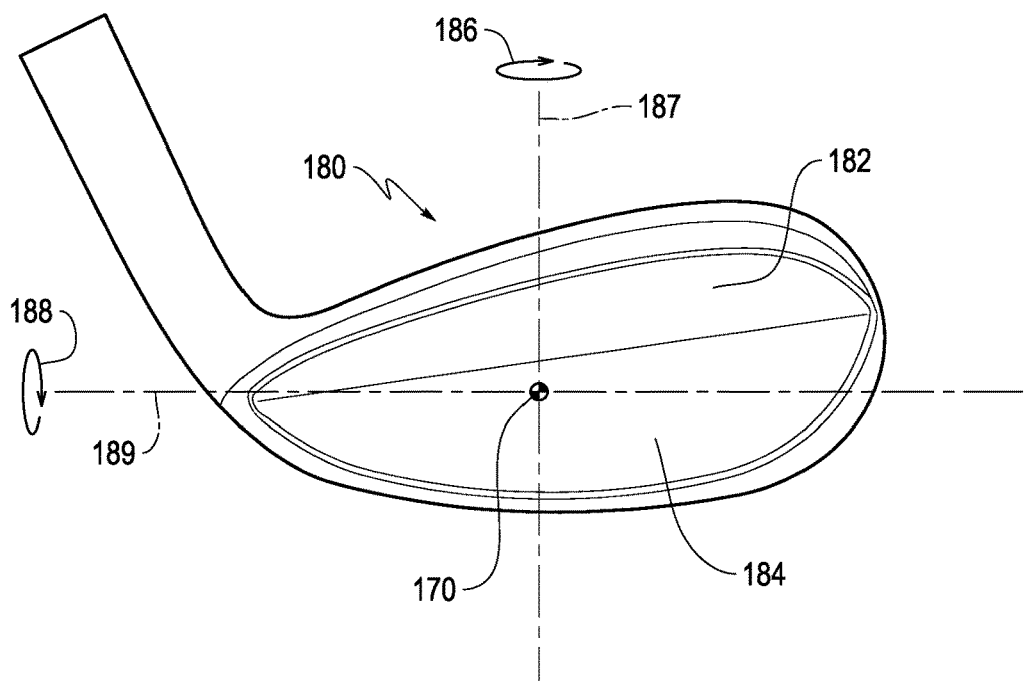
FIG. 2 shows a rear schematic view of the exemplary golf club head of FIG. 1.

Shown in FIGS. 1 and 2 is a golf club head 100 in accordance with one or more aspects of the present disclosure. A main body of this golf club head may be bounded by a toe portion 110, a heel portion 120 opposite the toe portion, a top portion 130, and a sole portion 140 opposite the top portion. A hosel portion 150 for securing the club head to an associated shaft (not shown) may extend from the heel portion, and the hosel portion may in turn define a virtual central hosel axis 152.

The club head may further include a striking face 160 at a front portion thereof. The striking face is the substantially planar exterior surface part of the front portion that generally conforms to a virtual striking face plane and that is arranged to contact a golf ball at a factory-designated loft angle taken between the striking face plane and the central hosel axis. The striking face may be formed with surface features that increase traction between the striking face and a struck golf ball to ensure both good contact with the ball (for example, in wet conditions) and impart a degree of spin to the ball, e.g., for stability in flight or to control better the rest position of a struck golf ball once it has returned to the ground by way of backspin. Included in these surface features may be a plurality of substantially parallel horizontal grooves or score lines 162 as well as other surface features (not shown) that form a texture pattern. The striking face may include a face center 164. Face center, as used herein, refers to the point on the striking face of the club head that is halfway between the heel-most extent and the toe-most extent of the score lines 162, and halfway between the topmost extent and sole-most extent of the score lines. In a golf club head where score lines extend to about a toe-side edge of the striking face, the toe-most extent of the score lines is defined by a virtual vertical plane extending through an apex of the golf club head's top portion. A virtual vertical center plane 166 perpendicular to the face plane may project through the face center in the front-to-rear direction of the club head, and a center of gravity 170 of the golf club head may be spaced from that virtual vertical center plane. In FIG. 1, for example, the center of gravity may be spaced heelward from the virtual vertical center plane. The center of gravity may be spaced by a distance 172 less than 5 mm from the virtual vertical center plane, and in more preferred embodiments, it may be spaced less than 2 mm from that virtual vertical center plane.

The golf club head is shown in FIG. 1 as being in the "reference position." As used herein, "reference position" denotes a position of a golf club head, e.g., the club head of FIG. 1, in which the sole portion of the club head contacts a virtual ground plane 10 such that the virtual central hosel axis 152 of the hosel portion lies in a virtual vertical hosel plane and the score lines 162 are oriented horizontally relative to the ground plane. Unless otherwise specified, all club head dimensions described herein are taken with the club head in the reference position.

The golf club head of FIGS. 1 and 2 preferably comprises an iron-type club head such as a wedge-type club head, and it may preferably have a loft angle of no less than 40°. More preferably, the golf club head may be a traditional blade-type club head, which may otherwise be referred to as a "player" type club head by certain golfers. As such, and as shown in FIG. 2, a rear 180 of the club head may include an upper blade portion 182 and a lower muscle portion 184. The upper blade portion may preferably comprise a substantially planar surface, and it may thus preferably lack any perimeter-weighting features. The muscle portion may project rearward from the upper blade portion. Mass of the golf dub head may be generally concentrated in the muscle portion, so the center of gravity 170 may be located soleward of the face center. And as shown in FIG. 2 specifically, moment of inertia ("MOI") Izz 186 of the golf club head may be measured about a virtual vertical axis 187 passing through the center of gravity, and MOI Ixx 188 of the golf club head may be measured about a virtual horizontal axis 189, parallel to the ground plane, that likewise passes through the center of gravity. As known to those of ordinary skill in the art, MOI is generally correlated with increasing the club head's natural resistance to rotation about a certain axis on off-centered golf ball impacts.

The golf club head of one or more aspects of this disclosure preferably has an internal structure that, compared to other "player"-type golf club heads, discretely moves weight from the heel portion or lower hosel portion to the sole/muscle portion or to the top of the hosel portion, thereby moving the center of gravity closer to the face center, i.e., where experienced golfers are more likely to hit the golf ball on the striking face, and correspondingly increasing both vertical (Izz) and horizontal (Ixx) MOI. Exemplary golf club heads having such an internal structure are described below. Each of these exemplary club heads may include the main body structure described above in connection with FIGS. 1 and 2.

Figure 3:
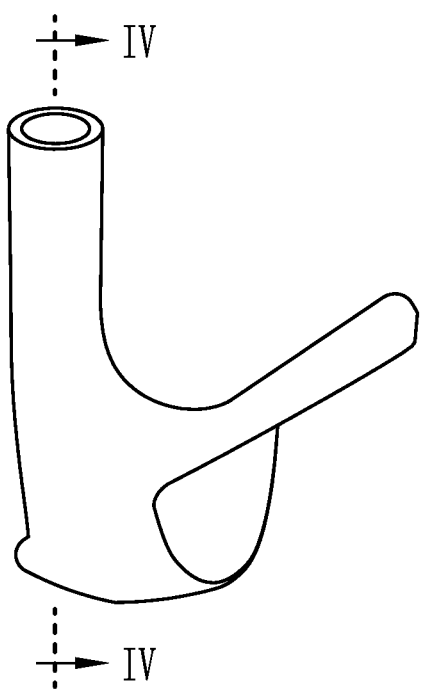
FIG. 3 shows a heel-side elevation view of an exemplary golf club head in accordance with one or more aspects of the present disclosure.
Figure 4:
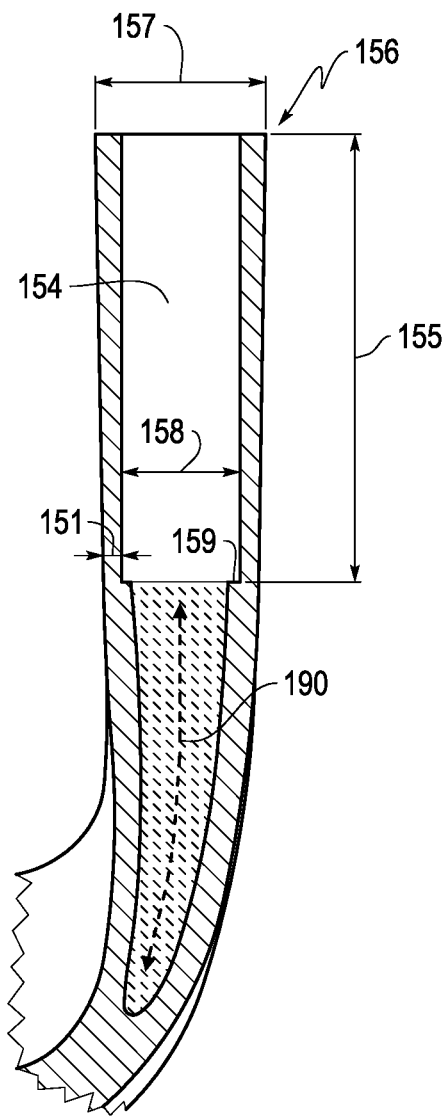
FIG. 4 shows a cross-section of the golf club head of FIG. 3 along the line IV-IV.

FIG. 4 shows a cross-section of a golf club head according to one aspect of the present disclosure taken along line IV-IV in FIG. 3. As shown, the hosel portion 150 of this club head may include a hosel bore 154 extending a depth 155 into the hosel portion from an open, topmost end 156 of the hosel portion. This bore may possess a top inner diameter 157 and a bottom inner diameter 158, which may be the same or may be different. And the hosel bore may terminate at its bottom at a metal shelf 159 that projects inward toward the virtual central hosel axis. The hosel portion sidewall (as well as the remainder of the golf club head main body) may constitute a first component preferably formed of a primary material such as steel and/or a material having a density no less than 8 g/cm³ and/or a melting point below 1600° C. And a minimum thickness 151 of the hosel portion sidewall, preferably measured at a bottom of the hosel bore, may be sufficient to ensure structural integrity of the hosel portion without negatively affecting vibrational feedback on golf shots. For example, this minimum thickness may be no less than 0.5 mm, and more preferably no less than 0.75 mm.

Soleward of the bottom of the hosel bore may be an insert 190 that serves as a second, or auxiliary, component. The insert may include a substantially cylindrical portion 192 (FIG. 8) with a central axis that is coaxial with the virtual central hosel axis. The insert may also include a heel portion shaped to generally conform to a heel contour of the golf club head. This insert may be formed of an auxiliary material such as a ceramic, and it may preferably have a melting point higher than that of the first component and a density less than that of the first component. As such, the insert may have a mass less than about 5 g in the golf club head, and relative to the overall mass of the golf club head, the mass of the insert may be less than 1.5%. This insert may by composed of at least 60% aluminum oxide ($Al_2O_3$). More specifically, this ceramic insert may be composed of 20% $SiO_2$, 10% $ZrO_2$, and 70% $Al_2O_3$, although each of these percentages may vary by up to about 10%. By adjusting the ceramic composition, material properties of the insert may be tuned to achieve a weight distribution target, e.g., increased moment of inertia, lower and/or centered center of gravity location, or a particular vibrational frequency upon impact. The insert may also possess the following properties: (i) a bonding strength of 15 MPa; (ii) a porosity of no more than 40%, preferably 30%; (iii) absorption of 30%; (iv) a melting point greater than 2500° C.; and (v) a density no greater than 3 $g/cm^3$, preferably no greater than 2 $g/cm^3$. But like the composition of the insert, the insert's bonding strength, porosity, absorption, and density may vary to achieve a particular weight distribution target.

Figure 5:
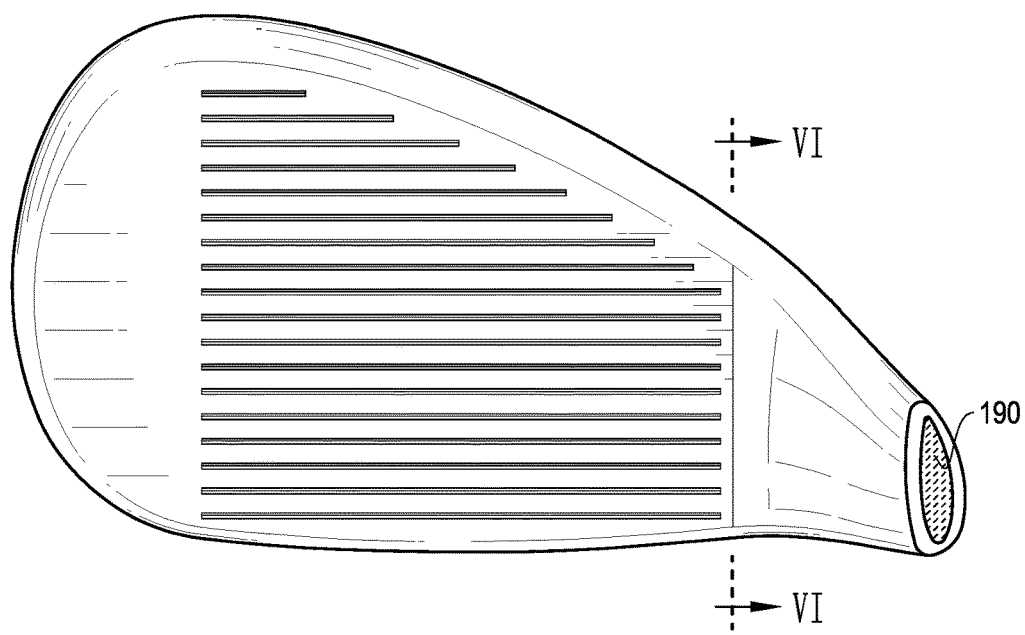
FIG. 5 shows a front perspective view of the golf club head of FIG. 3 with the hosel removed.
Figure 6:
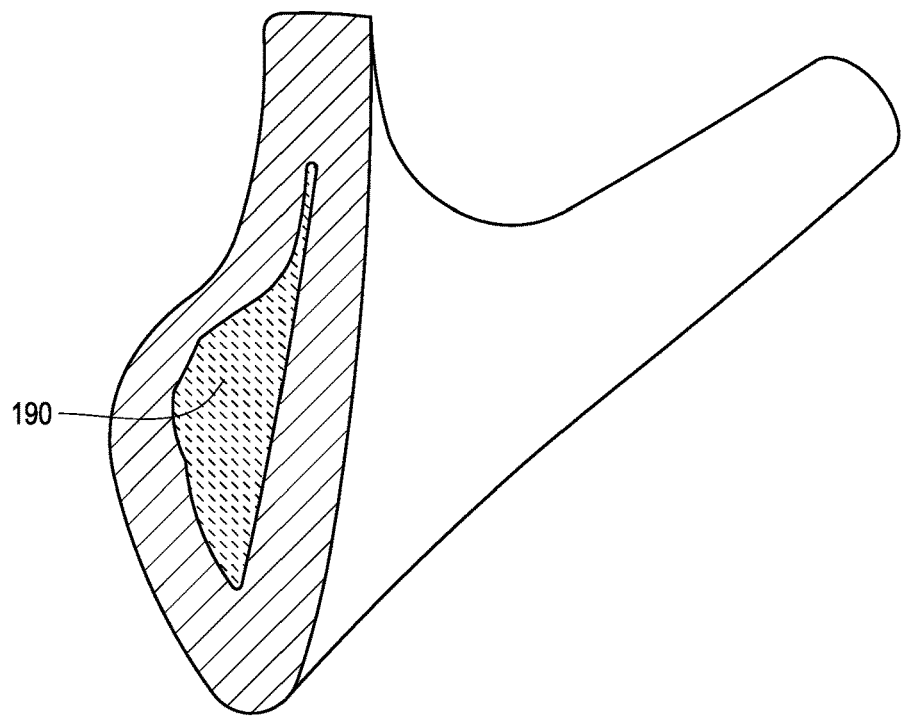
FIG. 6 shows a cross-section of the golf club head of FIG. 5 along the line VI-VI.

As shown in FIG. 6, which shows a cross-section taken at the line VI-VI in FIG. 5, the insert 190 may extend from the hosel portion into the heel portion of the golf club head. And this insert may impact various MOI values of the golf club head. For example, vertical MOI Izz may be greater than 3,000 $g*cm^2$, and horizontal MOI Ixx may be greater than 1,000 $g*cm^2$.

Figure 7:
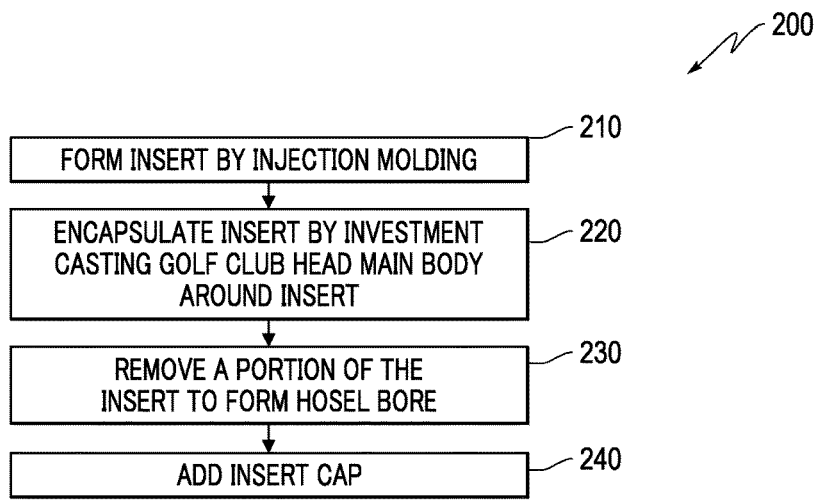
FIG. 7 shows an exemplary method of manufacturing the golf club head of FIG. 3.
Figure 8:
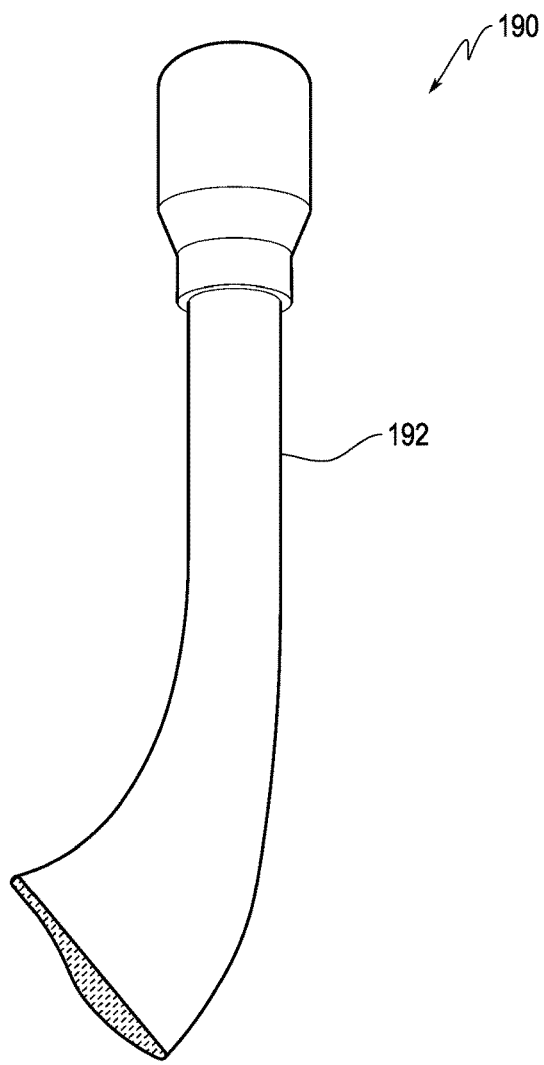
FIG. 8 shows a close-up view of the insert within the golf club head of FIG. 3.
Figure 9:
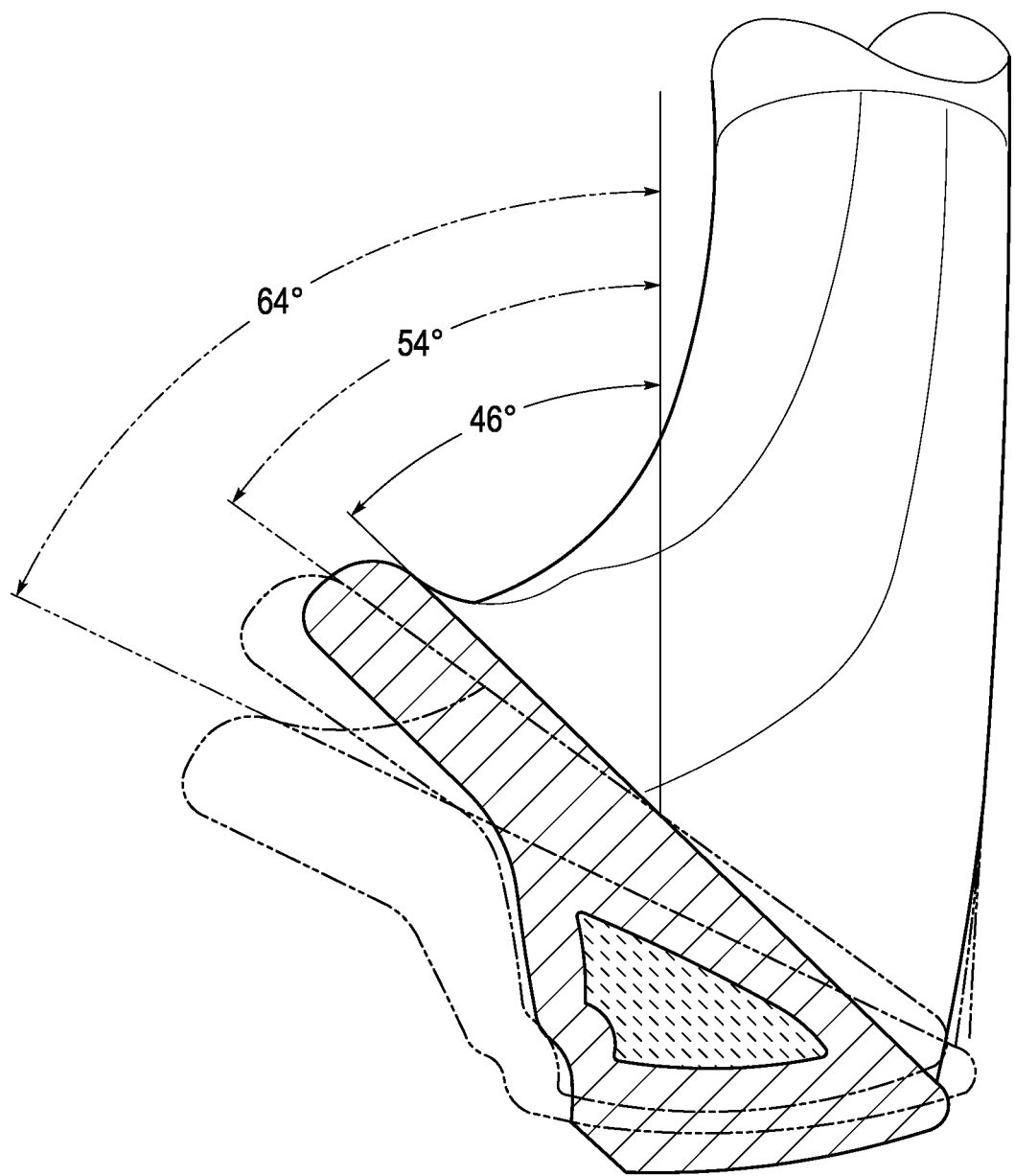
FIG. 9 shows overlapping club heads as part of a method of designing the insert of FIG. 8.

FIGS. 7-12 show an exemplary method 200 of forming the golf club head of FIGS. 3-6. In a first step 210, the insert may be formed by, e.g., injection molding. FIG. 8 shows one embodiment of the insert 190 after this first forming step. This insert may preferably be designed by overlaying various club lofts in a computer-assisted design ("CAD") program and selecting an overlapping region of those club heads while accounting for necessary constraints such as minimal steel wall thickness for integrity of the hosel and/or heel portions. For example, FIG. 9 shows an insert formed in an overlapping area of club heads having lofts of 46°, 54°, and 64°. This design process may ease manufacturing concerns and provide various cost benefits since a new insert is not required to be designed for each golf club head loft and sole shape. In one or more embodiments, a minimum steel wall thickness is no less than 0.5 mm and more preferably no less than 0.75 mm.

Figure 10:
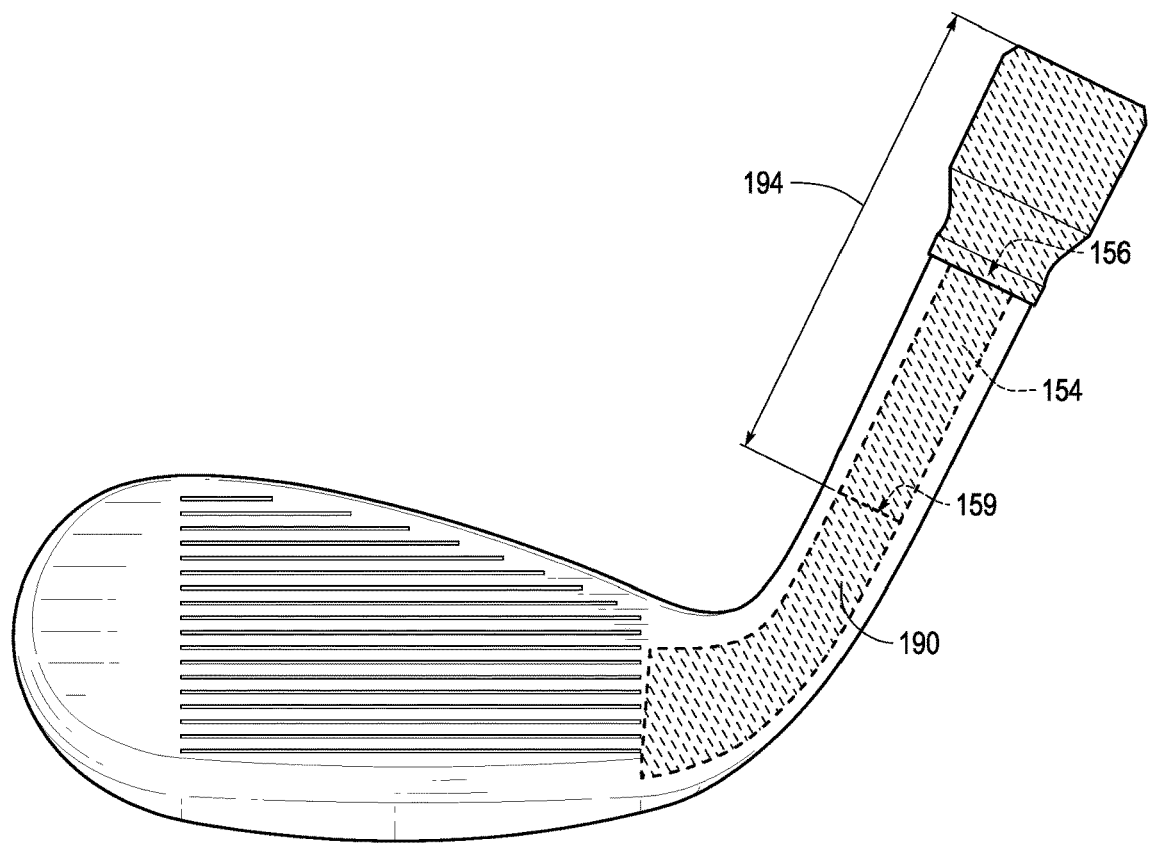
FIG. 10 shows a golf club head resulting from a second step of the method of FIG. 7.
Figure 11:
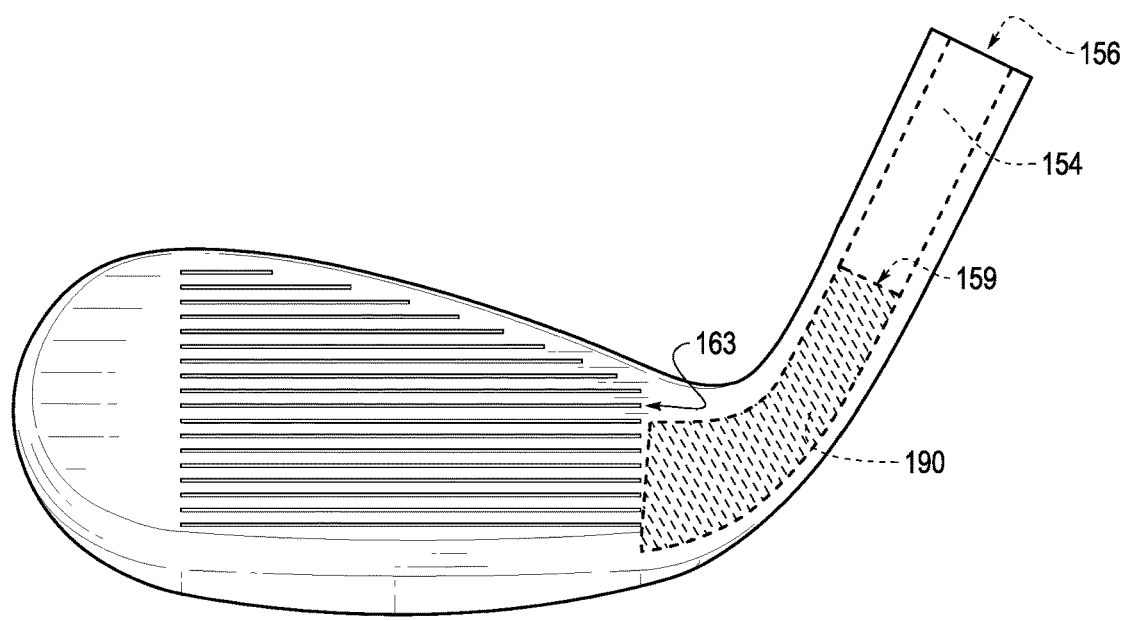
FIG. 11 shows a golf club head resulting from a third step of the method of FIG. 7.
Figure 12:
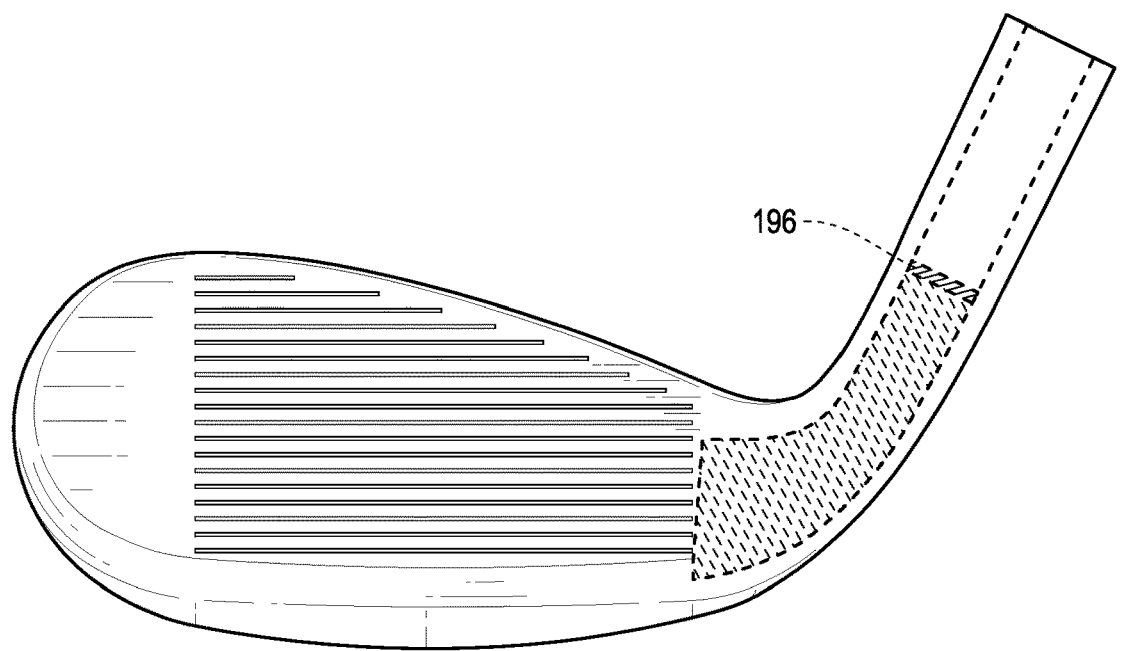
FIG. 12 shows a golf club head resulting from a fourth step of the method of FIG. 7.

In the second step 220 shown in FIG. 7, the golf club head main body may then be formed, e.g., by investment casting, around the insert 190 so to encapsulate the insert therein. The result of this step is shown in FIG. 10, in which the insert is shown to extend not only below the bottom metal shelf 159 of the hosel bore but also through the hosel bore and beyond the opening at the topmost end 156 of the hosel portion 150. The upper part 194 of the insert, i.e., the portions extending beyond the topmost opening of the hosel portion and extending into the hosel bore, may then be removed in the third step 230 shown in FIG. 7 by, e.g., machining. As shown in FIG. 11, which shows the result of this third step, the hosel bore 154 and topmost end 156 of the hosel portion may now be open so as to be able to receive a golf club shaft, and the insert 190 may extend soleward of the metal shelf 159 delimiting the bottom of the hosel bore. As also shown in FIG. 11, the insert may not extend beyond the heel-most extent 163 of the score lines formed on the striking face. Preferably, the insert may extend to about the heel-most extent of those score lines. This ensures that the insert does not extend into the hitting zone of the striking face, which may minimize any change to traditional feel and sound of the golf club head at impact with the golf ball. And in the final step 240 of FIG. 7, the result of which is shown in FIG. 12, an insert cap 196 may be introduced into the hosel bore so as to rest on the metal shelf 159. This insert cap, which may be formed of Al or ABS plastic, may provide a protective barrier between a tip end of the shaft and the topmost end of the insert. In other embodiments, the insert cap may not be necessary, as the topmost end of the insert is covered by an epoxy layer when the tip end of the shaft is affixed in the hosel bore. By thus forming the main body of the golf club head around the insert, space that would otherwise be filled by denser metallic material is instead occupied by, e.g., a ceramic material. Mass is thus selectively removed from the hosel and heel portions, thereby accomplishing the goal of moving the center of gravity closer to the face center.

Figure 13:
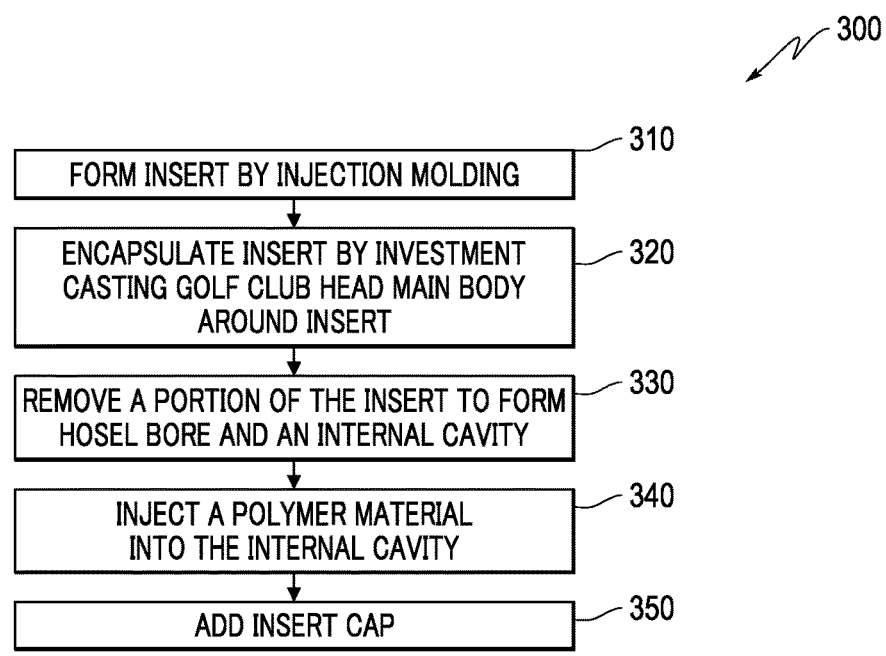
FIG. 13 shows an exemplary method of manufacturing a golf club head in accordance with one or more aspects of the present disclosure.
Figure 14:
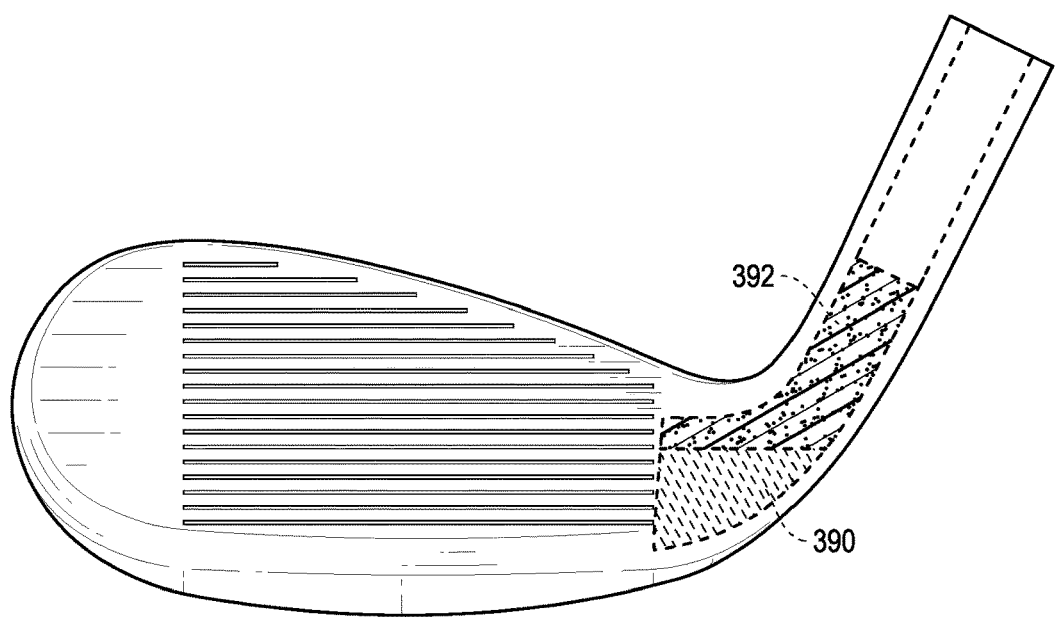
FIG. 14 shows a golf club head resulting from a fourth step of the method of FIG. 13.
Figure 15:
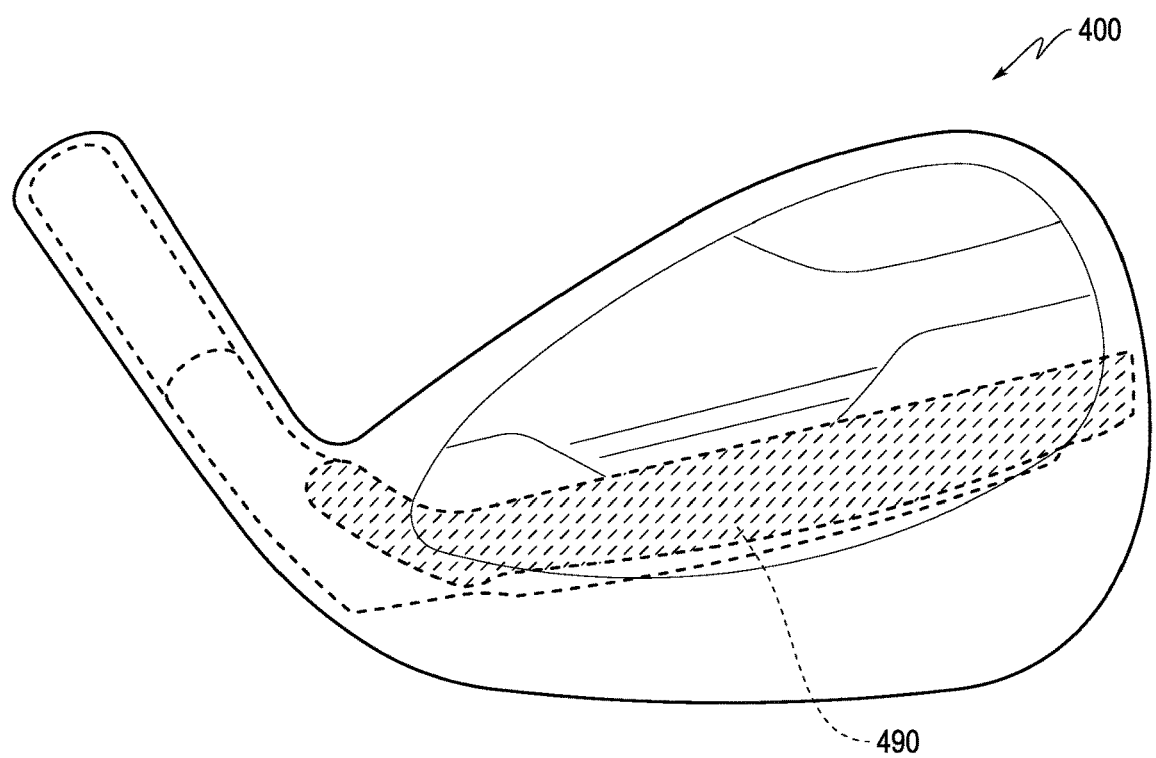
FIG. 15 shows a rear cutaway view of a golf club head in accordance with one or more aspects of the present disclosure.
Figure 16:
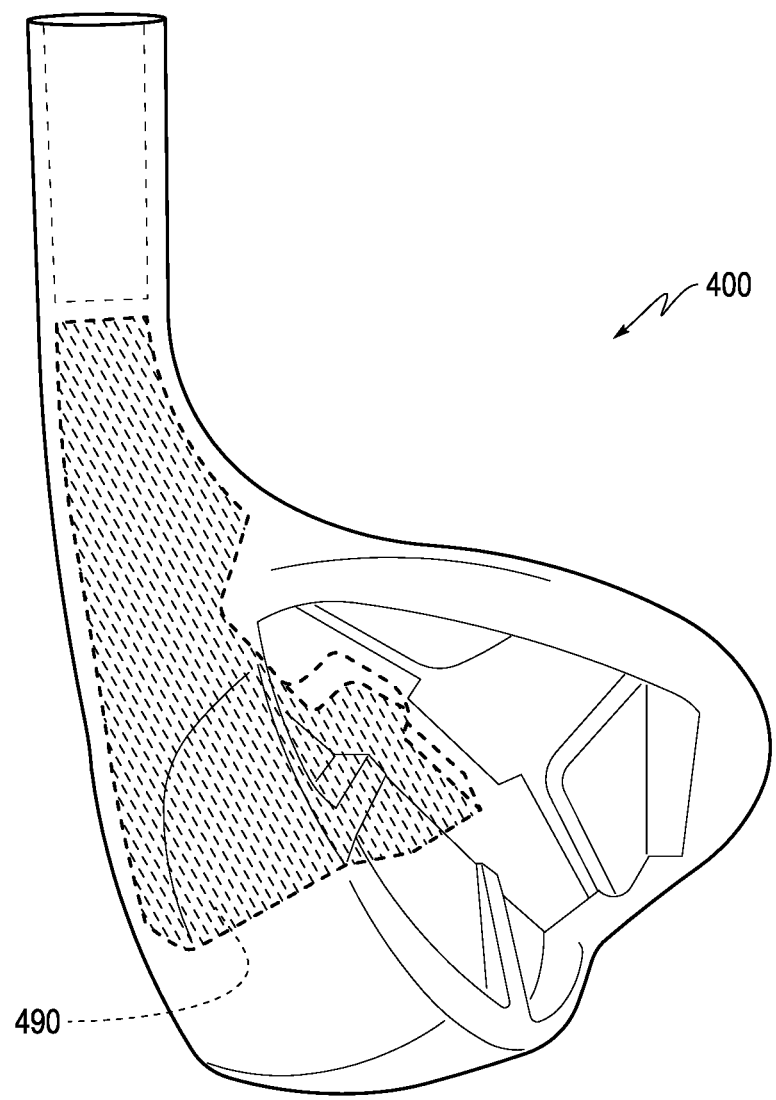
FIG. 16 shows a heel-side cutaway view of the golf club head of FIG. 15.

Other exemplary club heads are seen as being within the spirit and scope of the present invention. For example, as shown in FIG. 13 and like the method of FIG. 7, an insert 390 may first by formed at a first step 310 by, e.g., injection molding, and the main body of the golf club head may then be formed around the insert at a second step 320 by, e.g., investment casting. But at a third step 330, instead of removing only the upper part of the insert so as to form the hosel bore of the hosel portion, more of the insert may be removed so as to form an internal cavity below the hosel bore. More specifically, and as shown in FIG. 14, part 392, e.g., at least 50% by volume, or all of the insert may be removed by, e.g., mechanical agitation, chemical etching, or electrolytic etching, to form the internal cavity. In some aspects, the insert may be comprised of a material having high solubility in water or aqueous solutions. In such aspects, the insert may be easily dissolved out of the golf club head to form the cavity. This cavity may then be filled at the fourth step 340 in FIG. 13 by injecting therein material such as a polymer foam that later solidifies. This fourth step may thus introduce a vibration dampening material within the club head or allow tuning of the location of the center of gravity by, e.g., varying the density of the polymer material. And as in the method of FIG. 7, an insert cap may then be introduced at a fifth step 350 into the hosel bore so as to rest on the metal shelf delimiting the bottom of the hosel bore.

Figure 17:
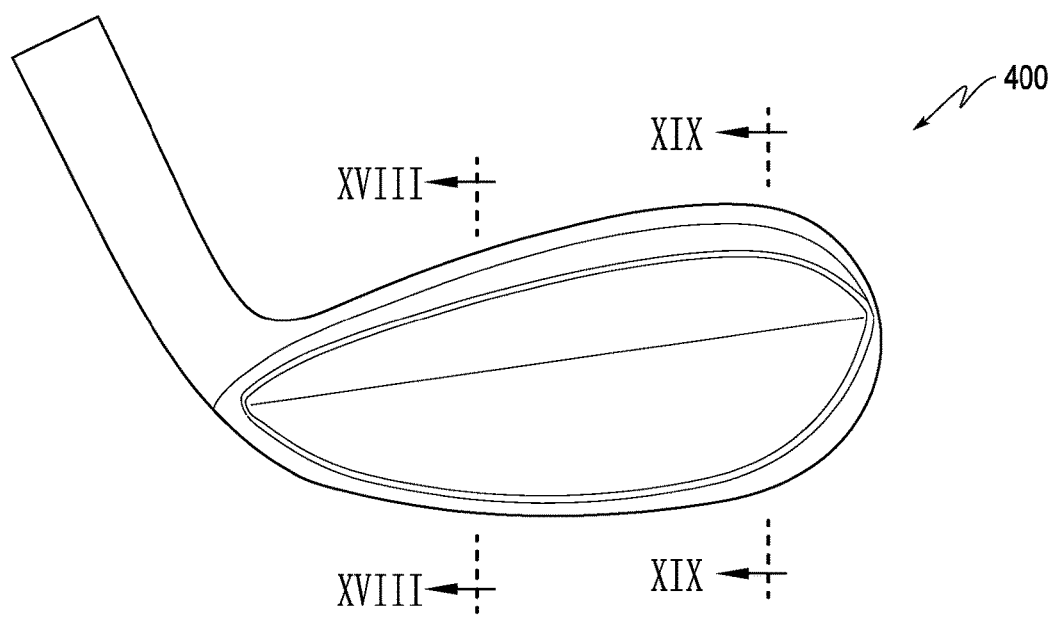
FIG. 17 shows a rear schematic view of the golf club head of FIG. 15.
Figures 18, 19:
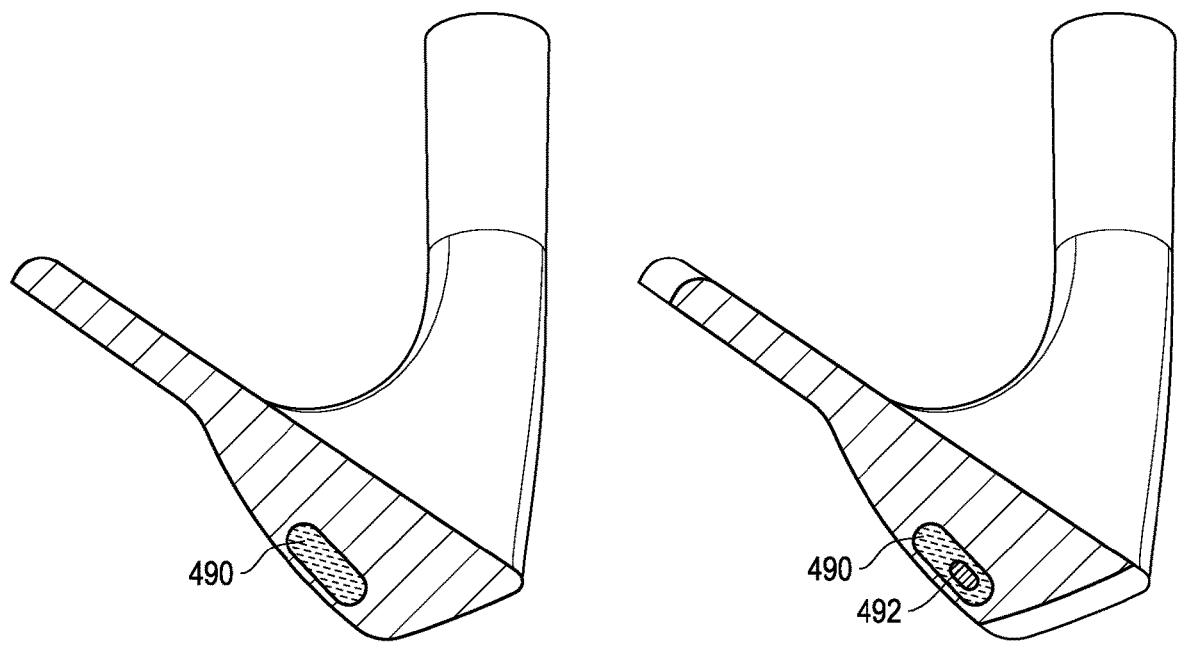
FIG. 18 shows a cross-section of the golf club head of FIG. 17 along the line XVIII-XVIII.
FIG. 19 shows a cross-section of the golf club head of FIG. 17 along the line XIX-XIX.

Yet other exemplary club heads are considered as being within the spirit and scope of the present invention. For example, although FIGS. 10-12 and 14 show the insert as extending only to the heel-most extent of the score lines, this need not be the case. Indeed, as shown in the exemplary golf club head 400 of FIGS. 15-19, the insert 490 may extend farther into the sole portion or to the toe portion of the golf club head. This insert may in fact extend the entire distance from the heel to the toe. Such a configuration may be more feasible in "game-improvement" type golf club heads, which generally have a larger sole volume to accommodate such an insert. The golfer using a "game-improvement" club head may also find less objectionable any changes in sound and/or feel that result from the insert extending into the striking face. In fact, the presence of the insert may provide a vibrational dampening effect and improve feel on off-center impacts. And as shown in FIG. 19, which shows a cross-section taken along the line XIX-XIX of the golf club head of FIG. 17, a high density portion 492 may be co-molded with or otherwise located within the insert at the toe portion. This high density portion may be a metallic material, e.g., a tungsten alloy, and it may have a density greater than 10 g/cm$^3$. Including such a high density portion in the insert may be beneficial because it can add mass to the toe portion of the golf club head to increase MOI, it can improve feel of the golf club head upon striking a golf ball, and it may ultimately reduce manufacturing costs.

In the foregoing discussion, the present invention has been described with reference to specific exemplary aspects thereof. However, it will be evident that various modifications and changes may be made to these exemplary aspects without departing from the broader spirit and scope of the invention. Accordingly, the foregoing discussion and the accompanying drawings are to be regarded as merely illustrative of the present invention rather than as limiting its scope in any manner.

What is claimed is:

1. A golf club head that, when oriented in a reference position, comprises:
   a top portion;
   a sole portion;
   a heel portion;
   a toe portion opposite the heel portion;
   a hosel portion extending from the heel portion and comprising a hosel bore with an open end for receiving a shaft and a bottom surface opposite of the open end;
   a striking face defining a virtual face plane and having a face center and a plurality of score lines;
   a virtual vertical plane perpendicular to the virtual face plane and extending through the face center;
   a ceramic component that is located entirely heel-ward of the plurality of score lines and substantially encapsulated by a metallic material; and
   a center of gravity that is located no more than 5 mm from the virtual vertical plane,
   wherein the metallic material that surrounds the ceramic component has a minimum wall thickness of at least 0.5 mm.

2. The golf club head of claim 1, wherein the ceramic component has a mass no greater than 5.0 g.

3. The golf club head of claim 1, wherein the golf club head further comprises an overall head mass and the ceramic component has a mass less than 1.5% of the overall head mass.

4. The golf club head of claim 1, wherein at least 60% of the ceramic component is aluminum oxide.

5. The golf club head of claim 1, wherein the ceramic component has a density no greater than 3 g/cm$^3$.

6. The golf club head of claim 5, wherein the density is no greater than 2 g/cm$^3$.

7. The golf club head of claim 1, wherein the ceramic component is injection molded.

8. The golf club head of claim 1, further comprising a solidified polymeric foam that is located entirely heel-ward of the score lines.

9. The golf club head of claim 1, further comprising a loft angle no less than 40 degrees.

10. A wedge-type golf club head that, when oriented in a reference position, comprises:
    a top portion;
    a sole portion;
    a heel portion;
    a toe portion opposite the heel portion;
    a striking face defining a virtual face plane and having a face center and a plurality of score lines;
    a virtual vertical plane perpendicular to the virtual face plane and extending through the face center;
    a ceramic component that is located entirely heel-ward of the plurality of score lines;
    a center of gravity;
    a moment of inertia about a vertical axis through the center of gravity no less than 3,000 g*cm$^2$; and
    a moment of inertia about a horizontal axis parallel to the virtual face plane and through the center of gravity no less than 1,000 g*cm.

11. The golf club head of claim 10, wherein the ceramic component has a mass no greater than 5.0 g.

12. The golf club head of claim 10, wherein the golf club head further comprises an overall head mass and the ceramic component has a mass less than 1.5% of the overall head mass.

13. The golf club head of claim 10, wherein at least 60% of the ceramic component is aluminum oxide.

14. The golf club head of claim 10, wherein the ceramic component has a density no greater than 3 g/cm$^3$.

15. The golf club head of claim 14, wherein the density is no greater than 2 g/cm$^3$.

16. The golf club head of claim 10, wherein the ceramic component is injection molded.

17. A set of golf club heads comprising:
    a first golf club head having a first loft and a first ceramic component that is substantially encapsulated by a first metallic material in the first golf club head; and
    a second golf club head having a second loft that is greater than the first loft and a second ceramic component that is substantially encapsulated by a second metallic material in the second golf club head and is sized and shaped to be substantially the same as the first ceramic component,
    wherein the first and second metallic materials that respectively surround the first and second ceramic components each have a minimum wall thickness of at least 0.5 mm.

18. The set of golf club heads of claim 17, further comprising a third golf club head having a third loft that is greater than the second loft and a third ceramic component that is substantially encapsulated in the third golf club head and is sized and shaped to be substantially the same as the first ceramic component.

19. The set of golf club heads of claim 17, wherein:
    the first golf club head has a first center of gravity and a first moment of inertia about a vertical axis through the first center of gravity of no less than 3,000 g*cm$^2$; and
    the second golf club head has a second center of gravity and a second moment of inertia about a vertical axis through the second center of gravity of no less than 3,000 g*cm$^2$.

* * * * *